INVENTOR.
ZEEV GOLDSTEIN 3,291,439
PUSH-BUTTON FLUSHING VALVE
Zeev Goldstein, Givataim, Israel; Mira Goldstein, administratrix of the estate of Zeev Goldstein, deceased
Filed Dec. 16, 1963, Ser. No. 330,837
Claims priority, application Israel, Feb. 8, 1963, 18,695
3 Claims. (Cl. 251—46)

The present invention relates to valves and particularly to push button operated flushing valves.

An object of the present invention is to provide a valve of the above type which is of very simple and sturdy construction, is of reliable performance, and avoids the need for springs for operating the valve, the latter being a main cause for the frequent break-down experienced with such valves.

A further object of the invention is to provide a valve of the foregoing type which may be conveniently locked in closed position.

The accompanying drawings illustrate, by way of example only, one preferred embodiment of the invention. In the drawings.

Figure 1:
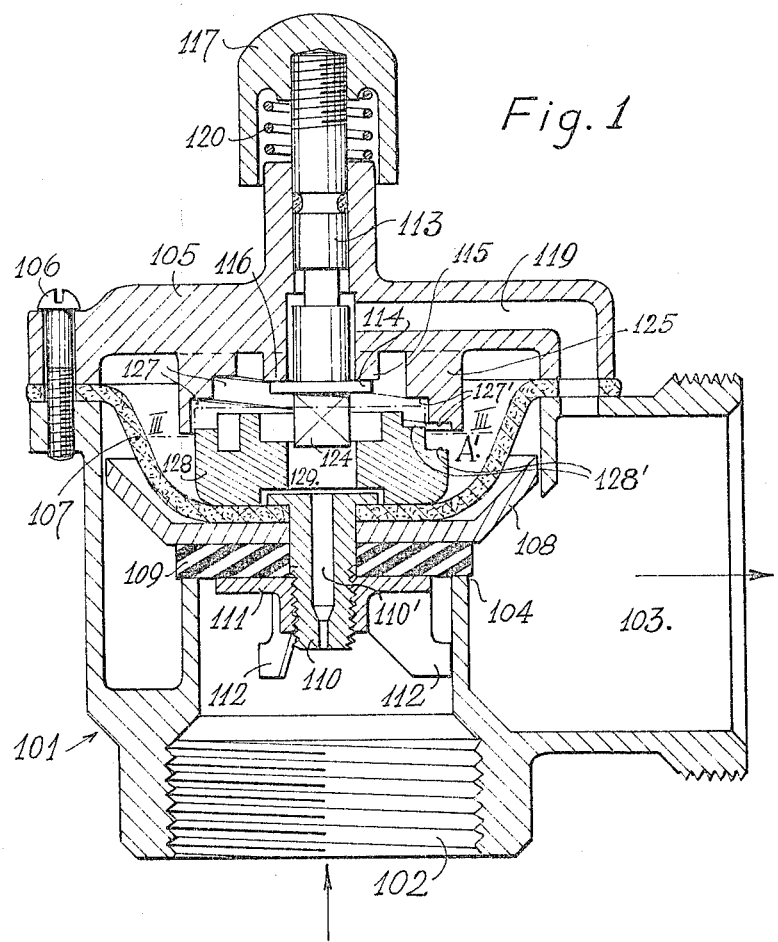
FIG. 1 is a sectional view of a valve constructed in accordance with the invention, the valve being in its closed position.
Figure 2:
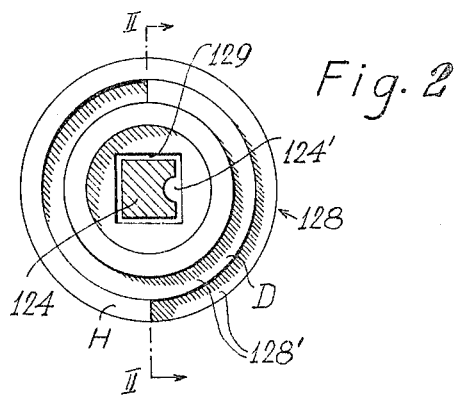
FIG. 2 is a sectional view along lines III—III of FIG. 1 illustrating a portion of the locking means.

Valve chest 101 has an inlet opening 102, an outlet opening 103, and a valve seat 104. Bonnet 105 closes the top of the valve chest by means of screws 106. Flexible membrane 107, secured between bonnet 105 and valve chest 101, defines a chamber A' between it and bonnet 105. Membrane 107 carries at its underside the valve body comprising dished plate 108 and valve member 109, the latter two being fixed by bolt 110 having bore 110' therethrough, and nut 111 carrying guiding ribs 112.

The bonnet 105 is provided with a central outlet 115 coaxial with bolt 110, and with a slidable stem 113 carrying auxiliary valve member 114 engageable with valve seat 116 surrounding the outlet 115. A depressible and rotatable push-button 117 is supported on the opposite end of stem 113, and is held up by a weak spring 120, which spring may be omitted. A bypass channel 119 is formed within the bonnet 105 leading from outlet 115 into outlet 103.

Stem 113 carries a square-shaped end portion 124. The bonnet 105 has a thickened central part through the stem 113 extends and which is marked in the drawing by the number 125. Into the inner side of this part are milled a pair of concentric screw threads 127 which form flat cam surfaces 127', each of the threads being of one turn only. Onto the square head 124 fits loosely a body 128 which is roughly of cylindrical shape and has in its top face a complementary-shaped (i.e., square) hole 129 slidably receiving the square head 124 without performing a turning movement. The said top face, i.e., the side of body 128 which is directed toward valve 116, is provided with concentric threads D and H complementary to the threads 127, thereby defining flat cam surfaces 128' cooperable with cam surfaces 127'.

The operation of the illustrated valve is as follows: Chamber A' defined between membrane member 107 and bonnet 105 is closed against the outside except for the narrow duct formed by bore 110' through which it is filled with water under pressure from the main. Because of this pressure, valve member 109 is pressed onto seat 104, and the flushing valve remains closed. The same pressure holds the auxiliary valve member 114 on its seat 116. By depressing push-button 117, this pressure is released, the water from chamber A' flowing out through the now opened bypass 119 into the outlet 103. With the release of this pressure, valve member 109 is lifted from its seat 104 by the incoming water which flows through the valve chest from the inlet 102 to the outlet 103. Flushing thus occurs during this time that the main valve is open. During flushing, the push-button 117 returns, by the water pressure aided by spring 120, which spring could be omitted moving auxiliary valve member 114 back onto its seat 116, a small quantity of water will pass through bore 110', slowly filling the now closed chamber A'. This forces the main valve member 109 onto its seat and thus automatically restores the valve to its closed position after a short time.

Should it be desired to lock or to immobilize the valve member 109 on its seat, the push-button 117 is rotated, whereby the body 128 serving as a pressure member, moves forwardly into the position shown in the drawings, pressing on the valve body and sealing the passage from the supply pipe into the outlet 103. The lead of the screw-threads 127, D and H, is so chosen that less than a full turn of push-button 117 will bring body 128 from the open to the closed position. For that purpose, a double thread has been provided as indicated earlier.

The body 128 remains in its closed position as long as the turning of button 117 is not reversed. When button 117 is returned to unlock the valve, the body 128 will still remain in the closing position at the start, as shown in FIG. 1, but can slide rearwardly on the square head 124, and will do so under the pressure of the oncoming water. The space between the square head 124 and hole 129 is generally sufficient to permit water entering through bore 110' to pass therebetween. An additional groove 124' may, however, be provided for that purpose if desired.

It is to be understood that the described embodiment of the invention is illustrative only, and that many other embodiments, variations, and applications of the invention, or the several features thereof disclosed, may be made without departing from the spirit or scope of the invention as defined in the following claims.

I claim:

1. A flushing valve, comprising: a valve housing including an inlet opening and an outlet opening; a valve seat disposed within the valve housing between said inlet and outlet openings; a flexible membrane within the housing and forming a substantially closed chamber therein; said membrane movably supporting a valve member permitting the latter to be moved into and out of engagement with the valve seat for closing and opening the valve; said valve member having a bore providing communication between the inlet opening and said chamber; a bypass channel leading from the said chamber into the outlet opening; an auxiliary valve member normally urged by the pressure of water in the chamber for closing said bypass channel; a depressible and rotatable push-button, adapted, upon depression, to move said auxiliary valve member to its open position and thereby to open said bypass channel; and a pressure member disposed so as to be mechanically connected to said push-button when the latter is depressed and to be moved by the rotation of the depressed push-button into engagement with said membrane for locking said valve member in closed position on said valve seat.

2. A flushing valve as defined in claim 1, wherein said pressure member is formed with a shaped opening slidably receiving a complementary shaped element carried by said push-button.

3. A flushing valve as defined in claim 2, wherein said pressure member is formed with a cam surface adapted to force the pressure member against said membrane when the pressure member is rotated by said push-button.

(References on following page)

References Cited by the Examiner

UNITED STATES PATENTS

| | | | |
|---|---|---|---|
| 171,514 | 12/1875 | Hyde | 251—46 |
| 894,734 | 7/1908 | Haas | 251—42 |
| 1,714,591 | 5/1929 | Darrow | 251—42 |
| 2,491,521 | 12/1949 | Samiran | 251—46 X |
| 2,895,707 | 9/1953 | Bailey | 251—42 X |

M. CARY NELSON, *Primary Examiner.*

A. ROSENTHAL, *Assistant Examiner.*